United States Patent [19]

Ion

[11] 4,188,835
[45] Feb. 19, 1980

[54] MOTION TRANSMITTING REMOTE CONTROL ASSEMBLY

[75] Inventor: John C. Ion, Doylestown, Pa.

[73] Assignee: Teleflex Incorporated, Limerick, Pa.

[21] Appl. No.: 507,391

[22] Filed: Sep. 19, 1974

[51] Int. Cl.$^2$ .............................. F16C 1/10; F16C 1/02
[52] U.S. Cl. ..................................... 74/501 R; 74/502; 64/2 R
[58] Field of Search ............... 74/501 R, 502; 64/2 R, 64/23

[56] References Cited

U.S. PATENT DOCUMENTS

| | | | |
|---|---|---|---|
| 3,021,722 | 2/1962 | Bratz et al. | 74/501 |
| 3,135,132 | 6/1964 | Bratz | 64/2 R X |
| 3,362,249 | 1/1968 | Richoux | 74/501 |
| 3,452,615 | 7/1969 | Gregory, Jr. | 74/501 |
| 3,464,285 | 9/1969 | McCabe | 64/2 R X |
| 3,509,782 | 5/1970 | Molner | 74/501 |
| 3,631,731 | 1/1972 | Hawtree | 74/501 R |
| 3,643,523 | 2/1972 | Michaila | 74/502 |
| 3,841,171 | 10/1974 | Young, Jr. | 74/501 R |
| 3,945,268 | 3/1976 | Ion et al. | 74/501 R |

FOREIGN PATENT DOCUMENTS 264397  1/1950  Switzerland ............................. 74/501

*Primary Examiner*—C. J. Husar
*Assistant Examiner*—Frank McKenzie
*Attorney, Agent, or Firm*—McGlynn and Milton

[57] ABSTRACT

A motion transmitting remote control assembly including a flexible conduit, a motion transmitting core element supported for axial movement within the conduit, antifriction members for engaging the core element for facilitating movement thereof, retainer members for retaining the antifriction members, and a race member disposed between the antifriction members and the conduit; the race member including a race portion engaging the antifriction members and resilient means for urging the race portion toward the antifriction members and the antifriction members toward the core element.

14 Claims, 5 Drawing Figures

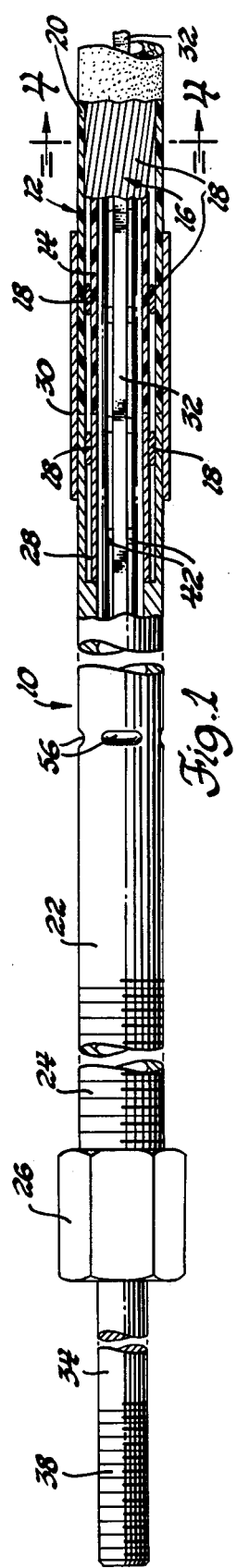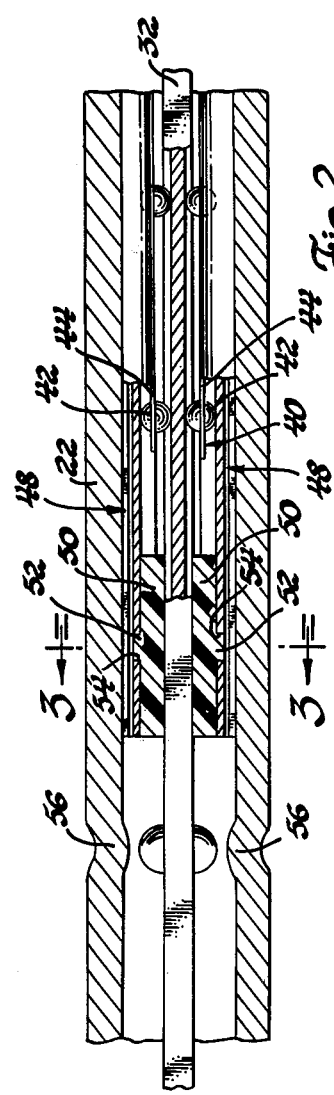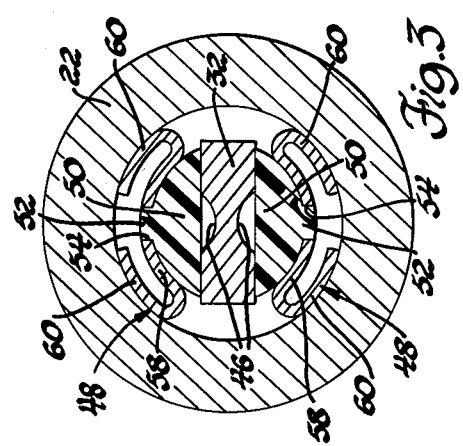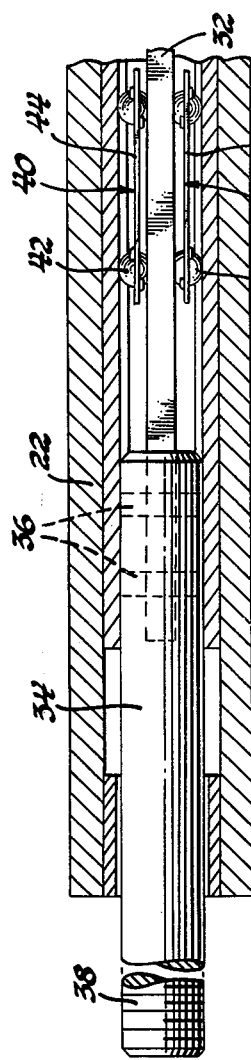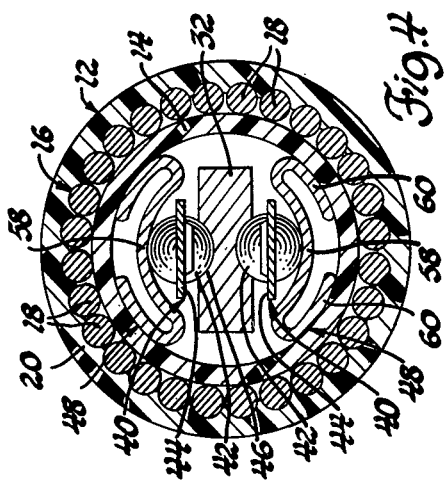

MOTION TRANSMITTING REMOTE CONTROL ASSEMBLY

This invention relates to a motion transmitting remote control assembly of the type which includes a flexible conduit, a core element supported for axial movement within the conduit, antifriction members for facilitating movement of the core element, and race members between the antifriction members and the flexible conduit.

It is important in assemblies of this type to maintain positive rolling action between the antifriction members and the core element. Positive rolling action between antifriction members and the core element ensures maximum efficiency in motion transmission. Loss of positive rolling action oftentimes occurs when the assembly is flexed or bent. This is due primarily to the distortion of the members in the assembly and the difference in the radius of curvature between the members on the outside and inside of the bend.

The instant invention provides a motion transmitting remote control assembly including race members which act as a spring to urge the antifriction members into positive rolling engagement with the core element. Accordingly, the race members include a race portion engaging the antifriction members and resilient means for urging the race portion toward the antifriction members and the antifriction members toward the core element. The resilient means in the preferred embodiment of the instant invention include two return bends extending inwardly from the outer edges of the race portion wherein the return bends are spaced from the race portion and in engagement with the conduit.

Other purposes and functions of the instant invention will be readily appreciated as the same becomes better understood by reference to the following detailed description when considered in connection with the accompanying drawings wherein:

FIG. 1 is an elevational view, partially broken away, of a preferred embodiment constructed in accordance with the instant invention;

FIG. 2 is a longitudinal, cross-sectional, elevational view of a portion of the instant embodiment shown in FIG. 1;

FIG. 3 is a transverse cross-sectional view taken generally along line 3—3 of FIG. 2;

FIG. 4 is a transverse cross-sectional view taken generally along line 4—4 of FIG. 1; and FIG. 5 is a longitudinal, cross-sectional view showing a modification of the instant invention.

Referring to the drawings, a motion transmitting remote control assembly constructed in accordance with the instant invention is generally shown at 10.

The assembly includes flexible conduit means, generally indicated at 12, which consists of a hollow, flexible casing member 14, flexible load bearing means, generally indicated at 16, comprising a plurality of helically wound wire members 18, and a flexible covering or sheath 20 surrounding the wire members 18.

Tubular end members or end fittings, such as end fitting 22, are attached at each end of the conduit means 12. The end member 22 is tubular and includes external threads 24 and a nut 26 for securing the end member 22 to a bulkhead. Since both ends of the assembly are substantially identical, only one end is shown. In the embodiment shown, the attachment between the end member 22 and the conduit means 12 is effected by providing an internal swaging sleeve 28 in the countersunk end of the end member 22. An annular space is thus defined between the swaging sleeve 28 and the interior wall of the end member 22 into which the wire members 18 extend. As shown in FIG. 1, the sheath 20 and casing 14 abut the end member 22 and swaging sleeve 28 respectively. A mandrel (now shown) is positioned within the swaging sleeve 28 and the end member 22 is swaged so that a relatively permanent connection is formed between the end member 22, the wire members 18, and the swaging sleeve 28. A sleeve member 30 is then disposed about the connection. It is noted that other methods may be employed to connect the load bearing wire members 18 to the end member 22. It is only necessary that the connection be one which permits the transmission of operational forces from the wire members 18 to the end member 22 for reaction. In other words, the conduit means 12 is reinforced by means, such as the wire members 18, so that it can carry the operational loads. The connection between the wire members 18 must, therefore, be capable of transmitting loads to the end fitting 22.

A motion transmitting core element 32 is supported for axial movement within the conduit means 12. The ends of the core element 32 are connected to a control rod member 34 by suitable means, such as a pair of pins 36 which extend through the control rod member 34 and core element 32. The control rod member 34 extends out of the end member 22 and is adapted for attachment either to a control or a controlled member. For this purpose, the end of the control rod member 34 may be provided with external threads 38 or some other means for attachment.

To facilitate axial movement of the core element 32, the assembly is provided with a plurality of antifriction members, generally indicated at 40, comprising a plurality of ball bearings 42 which are retained in spaced relationship by retaining means 44 consisting of a standard ball retainer. As shown the core element 32 includes suitable grooves 46 in which the ball bearings 42 ride. The purpose of the antifriction members 40, of course, is to facilitate axial movement of the core element 32 by reducing friction.

The assembly also includes race members, generally indicated at 48, which provide a rolling surface for the ball bearings 42 of the antifriction members 40. As shown in FIGS. 2 and 5, these race members 48 are unanchored and freely, axially movable with respect to the conduit means 12. Accordingly, the race members 48 are not subjected to tensile or compressive forces when the conduit means 12 is flexed or bent.

More specifically, and referring particularly to FIG. 2, the race members 48 terminate within the end members 22. The ends of the race members 48 are supported in radial, spaced relation with respect to the core element 32 by support means which comprise the shoe members 50. To provide the attachment between the race members 48 and the shoes 50, each shoe 50 is provided with a post 52 which extends into an aperture 54 in the race member 48. It is noted that the undersides of the shoe members 50 slidingly engage the core element 32. The ends of the race members 48 are consequently prevented from drooping toward the core element 32 and possibly interfering with the axial movement thereof.

To prevent the race members 48 from moving out of the end member 22, the end member 22 is provided with for circumferentially disposed indentations 56. These indentations 56 merely act as stops to keep the race members 48 within the conduit means 12.

It is pointed out that in the assembly described, the race members 48 are not called upon to transmit loads to the end members 22. For this reason, it is unnecessary that they be anchored or otherwise in force transmitting relationship with the end members 22. The load bearing or load transmitting function is accomplished by the load bearing means 16 which reinforces the conduit means, comprising the wire members 18. The helically wound wire members 18, therefore, constitute a load path between the end members 22. Furthermore, the wire members 18 are capable of flexing and bending to a much greater extent than "anchored" race members. Bending of the assembly is, therefore, relatively unrestricted by the race members 48. As a consequence, the use of unanchored race members 48 and the wire members 18 permits a greater degree of bending than motion transmitting remote control assemblies having fixed or anchored race members.

The race members 48 include a race portion 58 which is arcuate in transverse cross section to provide a race or path for the ball bearings 42. The race members 48 also include resilient means for urging the race portion 58 toward the ball bearings 42 and, consequently, the ball bearings 42 are urged toward the core element 32. This, therefore, ensures positive rolling action between the ball bearings 42 and the core element 32 which results in maximum efficiency in motion transmission.

The resilient means includes two return bends 60 which extend inwardly from the outer edges of the race portion 58. The return bends 60 are spaced from the race portion 58 and are in engagement with the conduit means 12. More specifically, the return bends 60 are generally parallel to the race portion 58. Furthermore, the return bends 60 are arcuate and conform generally to the curvature of the conduit means 12. That is, the curvature of the return bends 60 corresponds closely to the curvature of the inner surface of the flexible casing 14.

Due to the resilience of the return bends 60, the return bends push against the flexible casing 14 to urge the ball bearings 42 into positive rolling engagement with the core element 32. In other words, the race member 48 acts as a spring member for preloading the ball bearings 42. That is, the return bends 60 are flexed inwardly to some extent in the assembled position as shown in FIGS. 3 and 4.

In the event that the conduit means 12 is bent, the return bends 60 of the race members 48 will continue to urge the ball bearings 42 toward the core element 32 to facilitate positive rolling action therebetween.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A flexible motion transmitting remote control assembly comprising: flexible conduit means, a motion transmitting core element supported for axial movement within said conduit means, antifriction means for engaging said core element for facilitating movement thereof, retainer means for retaining said antifriction means, and a race member disposed between said antifriction means and said conduit means; said race member including a race portion engaging said antifriction means and spring-acting resilient means reacting between said conduit and said race portion for urging said race portion transversely with respect to the direction of movement of said core element toward said antifriction means thereby urging said antifriction means toward said core element.

2. An assembly as set forth in claim 1 wherein said resilient means includes two return bends extending inwardly from the outer edges of said race portion, said return bends being spaced from said race portion and in engagement with said conduit means.

3. An assembly as set forth in claim 2 wherein said return bends are generally parallel to said race portion.

4. An assembly as set forth in claim 2 wherein said return bends are arcuate and conform generally to the curvature of said conduit means.

5. An assembly as set forth in claim 4 wherein a substantial portion of said return bends are in direct contact with said conduit means.

6. An assembly as set forth in claim 5 wherein said race portion is arcuate.

7. An assembly as set forth in claim 6 wherein said return bends are generally parallel to said race portion.

8. An assembly as set forth in claim 2 wherein said assembly includes tubular end members at each end of said conduit means and flexible load bearing means surrounding a portion of said conduit means and attached to said end members.

9. An assembly as set forth in claim 8 including support means for supporting the ends of said race member.

10. An assembly as set forth in claim 9 including control rod members attached to the ends of said core element and extending out of said tubular end members.

11. An assembly as set forth in claim 10 wherein said support means includes a portion of said control rod members.

12. An assembly as set forth in claim 9 wherein said load bearing means includes a plurality of helically wound wire members.

13. An assembly as set forth in claim 12 wherein said conduit means includes a flexible casing member surrounded by said wire members.

14. An assembly as set forth in claim 13 wherein said conduit means includes a flexible sheath member surrounding said wire members.

* * * * *